United States Patent [19]
Ritter et al.

[11] 3,867,528
[45] Feb. 18, 1975

[54] STEROIDAL TOPICAL CREAM BASE

[75] Inventors: Lawrence Ritter, Suffern; Robert Arnold Nash, Spring Valley, both of N.Y.

[73] Assignee: American Cyanamid Company, Stamford, Conn.

[22] Filed: Oct. 11, 1973

[21] Appl. No.: 405,613

[52] U.S. Cl. .............................................. 424/241
[51] Int. Cl. ........................................... A61k 17/06
[58] Field of Search ..................................... 424/241

[56] References Cited
UNITED STATES PATENTS

| | | | |
|---|---|---|---|
| 3,592,930 | 7/1971 | Katz et al. | 424/243 |
| 3,829,570 | 8/1974 | Heider et al. | 424/241 |

*Primary Examiner*—Henry A. French
*Attorney, Agent, or Firm*—Ernest Y. Miller

[57] ABSTRACT

A topical cream base is described which is particularly useful with steroids. This cream base when used with steroid acetonides produces greater penetration of the skin and therefore enhances the therapeutic activity.

7 Claims, No Drawings

STEROIDAL TOPICAL CREAM BASE

DESCRIPTION OF THE INVENTION

This invention is concerned with a new pharmaceutical topical base for a cream preparation which provides more rapid and thorough penetration of the skin, resulting in enhanced therapeutic activity.

The new base comprises essentially of from 5 to 25% (W/W) of ethoxylated stearyl alcohol, from 0.9 to 4% (W/W) of benzyl alcohol, from 1 to 10% (W/W) of isopropyl palmitate, from 2 to 10% (W/W) of glycerin, from 2 to 10% (W/W) of sorbitol solution (U.S.P.), sufficient lactic acid or other acid to direct the final pH to 3.0-7.0 together with therapeutic ingredient and sufficient water to make up a weight of 100%.

A formulation of the pharmaceutical topical base using a steroid as the therapeutic ingredient may be illustrated as follows:

| Ingredient | % (W/W) |
|---|---|
| Steroid | 0.005 to 5.0 |
| Ethoxylated stearyl alcohol | 5 to 25 |
| Benzyl alcohol | 0.9 to 4 |
| Isopropyl palmitate | 1 to 10 |
| Glycerin | 2 to 10 |
| Sorbitol solution (U.S.P) | 2 to 10 |
| Lactic or other acid qs to pH 3.0-7.0 | |
| Water quantity sufficient ad | 100 |

Ethoxylated stearyl alcohol is a generic name for a nonionic emulsifying wax prepared by the reaction of stearyl alcohol with ethylene oxide. Since stearyl alcohol is derived from natural sources, the resulting ethoxylation product may also contain varying amounts of ethoxylated cetyl alcohol. The use of the term ethoxylated stearyl alcohol herein is intended to also include products resulting from the reaction of cetostearyl alcohol with ethylene oxide.

Among the steroids found useful as an ingredient of the pharmaceutical topical base are the following triamcinolone acetonide, triamcinolone acetonide-21-valerate, 16α,17α-cyclopentylidenedioxy-9α-fluoro-11β,12-dihydroxy-1,4-pregnadiene-3,20-dione, 16α,17α-cyclopentylidenedioxy-9α-fluoro-11β,21-dihydroxy-1,4-pregnadiene-3,20-dione-21-acetate and the like.

Topically such a formulation may be prepared by heating the ethoxylated stearyl alcohol and isopropyl palmitate to liquifying temperature. About 95% of the total volume of water is placed in a separate container followed by the glycerin and the sorbitol solution. This aqueous mixture is brought to a boil and then cooled to 60°-75°C. The therapeutic ingredient is added to the wax phase and the mixture is stirred until a clear solution is obtained. The benzyl alcohol is added and dissolved in the wax phase. The water phase is passed through a screen into the wax phase while maintaining agitation. Both phases are kept at about the same temperature during transfer. The mixture is cooled while agitation is continued. At a temperature of 50°-55°C. the balance of the formulation water is added. Cooling is continued with further agitation to 45°-48°C. If necessary, the pH is adjusted to 4.0-5.0 with lactic acid or other acid such as adipic acid. The batch is cooled with minimum agitation until the cream begins to set in its final form.

The efficacy of this base in promoting absorption of the therapeutic ingredient through the skin is evidenced by the results of clinical trials involving a total of 60 patients and employing a variety of adrenocortical steroids in known pharmaceutical bases as well as the base of this invention. The test employed was the vasoconstriction assay which is recognized as an acceptable indicator or topical anti-inflammatory activity of adrenocortical steroids and which has been described in the following publications:

Topical activities of Betamethasone Esters in Man, A. W. McKenzie and R. M. Atkinson, Archives of Dermatology 89, 741-746 (1964). Method for Comparing Percutaneous absorption of Steroids, A. W. McKenzie and R. B. Stoughton, Archives of Dermatology 86, 608-610 (1962). Percutaneous Absorption of Steroids, A. W. McKenzie, Archives of Dermatology 86, 611-614 (1962). Bioassay System for formulations of Topically Applied Glucocorticosteroids, R. B. Stoughton, Archives of Dermatology 106, 825-827 (1972).

In testing the topical cream base of the present invention the following formulations are used:

I (new base)

| | % (W/W) |
|---|---|
| Triamicinolone acetonide | 0.1 |
| Ethoxylated stearyl alcohol | 12.5 |
| Benzyl alcohol NF | 2.2 |
| Isopropyl palmitate | 2.0 |
| Glycerin U.S.P. | 4.0 |
| Sorbitol solution U.S.P | 5.0 |
| Lactic acid q.s. to pH 4.0-5.0 | |
| Water q.s. ad | 100.0 |

II (old base)

Triamcinolone acetonide 0.1% in old base formulated as follows:

| | % (W/W) |
|---|---|
| Triamcinolone acetonide | 0.1 |
| Glyceryl monostearate NF | 2.78 |
| Squalane | 2.0 |
| Polysorbate 80 U.S.P. | 1.0 |
| Polysorbate 60 | 3.0 |
| Spermaceti U.S.P. | 11.0 |
| Stearyl alcohol U.S.P. | 11.0 |
| Potassium sorbate | 0.111 |
| Sorbic acid NF | 0.1 |
| Sorbitol solution U.S.P. | 5.0 |
| Purified water q.s. to | 100 |

III — (new base) 16α,17α-cyclopentylidenedioxy-9α-fluoro-11β,21-dihydroxy-1,4-pregnadiene-3,20-dione in place of triamcinolone acetonide in formula I.

IV — (new base) Triamcinolone acetonide-21-valerate 0.1% in place of triamcinolone acetonide in formulation I. V — (new base) Formulation contains new base any steroid.

VI— (old base) Formulation contains old base without any steroid.

In carrying out the tests 10 mg. of preparations I-VI was placed on an area 2.0 to 2.5 cm. in diameter on the ventral surface of the forearm. The tests were conducted using volunteers with normal skin. The ventral forearm sites were then protected by an elevated plastic guard which allowed the formulation to remain in place and ambient conditions to prevail. The test sites were thoroughly washed 20 hours after application and readings taken within 2 to 3 hours after washing and again 5 to 6 hours later. Blanching (vasoconstriction) was determined on a graded basis as follows:
- − = no blanching
- + = just detectable blanching
- ++ = definite blanching, but not maximum
- +++ = marked maximum blanching The results obtained in two separate clinical trials employing the above procedure and method of evaluation are summarized in the following Tables I and II.

TABLE I

| | Preparations | | | | | | | | | | | |
|---|---|---|---|---|---|---|---|---|---|---|---|---|
| | I Triam. Aceton. 0.1% New Base | | II Triam. Aceton. 0.1% Old Base | | III Compound C 0.1% in New Base | | IV Compound D 0.1% in New Base | | V New Base As Placebo | | VI Old Base As Placebo | |
| Pat. No. | A* | B* | A | B | A | B | A | B | A | B | A | B |
| 1 | − | − | + | + | + | ++ | − | + | − | − | − | − |
| 2 | − | − | + | + | + | ++ | − | + | − | − | − | − |
| 3 | +++ | +++ | − | − | ++ | +++ | + | + | − | − | − | − |
| 4 | ++ | +++ | − | − | ++ | +++ | + | + | − | − | − | − |
| ×5 | ++ | ++ | − | − | ++ | ++ | + | + | − | − | − | − |
| 6 | ++ | ++ | − | − | ++ | ++ | + | + | − | − | − | − |
| 7 | − | − | − | − | ++ | ++ | − | − | − | − | − | − |
| 8 | ++ | ++ | − | − | +++ | ++ | + | + | − | − | − | − |
| 9 | ++ | ++ | − | − | +++ | ++ | + | + | − | − | − | 31 |
| 10 | + | ++ | − | − | ++ | + | − | − | − | − | − | − |
| 11 | + | ++ | − | − | ++ | + | − | + | − | − | − | − |
| 12 | ++ | +++ | − | + | ++ | +++ | ++ | + | − | − | − | − |
| 13 | ++ | +++ | − | + | ++ | +++ | ++ | + | − | − | − | − |
| 14 | − | − | − | − | − | − | − | + | − | − | − | − |
| 15 | − | − | − | − | − | − | − | + | − | − | − | − |
| 16 | − | + | − | − | + | + | + | + | − | − | − | − |
| 17 | − | + | − | − | + | + | + | + | − | − | − | − |
| 18 | ++ | ++ | − | + | ++ | ++ | − | − | − | − | − | − |
| 19 | ++ | ++ | − | − | ++ | ++ | − | − | − | − | − | − |
| 20 | + | ++ | − | − | − | ++ | + | + | − | − | − | − |
| 21 | + | ++ | − | − | − | ++ | + | + | − | − | − | − |
| 22 | + | + | + | + | ++ | ++ | + | − | − | − | − | − |
| 23 | + | + | + | + | ++ | ++ | + | − | − | − | − | − |
| 24 | − | + | − | − | − | + | − | − | − | − | − | − |
| 25 | − | + | − | − | + | + | − | − | − | − | − | − |
| 26 | ++ | + | − | − | + | + | + | − | − | − | − | − |
| 27 | ++ | + | − | − | + | + | + | − | − | − | − | − |
| 28 | − | + | − | − | + | − | − | − | − | − | − | − |
| 29 | − | − | − | − | + | − | − | − | − | − | − | − |
| 30 | − | − | − | − | ++ | ++ | − | − | − | − | − | − |
| − | 12 | 7 | 26 | 23 | 5 | 4 | 14 | 12 | 30 | 30 | 30 | 30 |
| + | 6 | 9 | 4 | 7 | 9 | 8 | 14 | 18 | 0 | 0 | 0 | 0 |
| ++ | 11 | 10 | 0 | 0 | 14 | 14 | 2 | 0 | 0 | 0 | 0 | 0 |
| +++ | 1 | 4 | 0 | 0 | 2 | 4 | 0 | 0 | 0 | 0 | 0 | 0 |
| Total Positive Responding | 18 | 23 | 4 | 7 | 25 | 26 | 16 | 18 | 0 | 0 | 0 | 0 |

* A = Reading after 20 plus hours.
B = Reading after 25 plus hours.
Compound C = 16α,17α-cyclopentylidenedioxy-9α-fluoro-11β,21-dihydroxy-1,4-pregnadiene-3,20-dione.
Compound D = Triamcinolone acetonide-21-valerate.

TABLE II

| | Preparations | | | | | | | | | |
|---|---|---|---|---|---|---|---|---|---|---|
| | I Triam. Aceton. 0.1% New Base | | II Triam. Aceton. 0.1% Old Base | | III Compound C 0.1% in New Base | | IV Compound D 0.1% in New Base | | V New Base As Placebo | |
| Pat. No. | A | B | A | B | A | B | A | B | A | B |
| 1 | ++ | + | − | − | + | − | − | − | − | − |
| 2 | ++ | ++ | − | − | +++ | ++ | + | − | − | − |
| 3 | − | − | − | + | ++ | ++ | − | + | − | − |
| 4 | ++ | +++ | − | + | + | + | − | − | − | + |
| 5 | + | − | − | − | + | + | + | + | − | − |
| 6 | + | + | + | ++ | + | + | ++ | + | − | − |
| 7 | ++ | ++ | + | + | ++ | ++ | + | + | − | − |
| 8 | ++ | ++ | − | − | + | + | − | − | − | − |
| 9 | + | + | ++ | ++ | ++ | − | ++ | − | − | − |
| 10 | + | − | − | − | + | ++ | + | + | + | − |
| 11 | ++ | ++ | + | + | ++ | ++ | + | + | − | − |
| 12 | ++ | ++ | − | − | +++ | ++ | + | + | − | − |
| 13 | + | + | + | + | ++ | + | − | − | − | − |
| 14 | ++ | ++ | − | − | ++ | ++ | − | − | − | − |
| 15 | ++ | ++ | − | − | ++ | + | − | − | − | − |
| 16 | ++ | ++ | + | + | +++ | ++ | + | − | − | − |

TABLE II — Continued

| Pat. No. | I Triam. Aceton. 0.1% New Base | | II Triam. Aceton. Old Base | | III Compound C 0.1% in New Base | | IV Compound D 0.1% in New Base | | V New Base As Placebo | |
|---|---|---|---|---|---|---|---|---|---|---|
| | A | B | A | B | A | B | A | B | A | B |
| 17 | ++ | ++ | + | + | ++ | ++ | + | + | − | − |
| 18 | ++ | + | + | − | ++ | ++ | + | − | − | − |
| 19 | + | + | + | + | + | + | + | + | − | − |
| 20 | + | + | − | − | + | + | + | + | − | − |
| 21 | + | + | − | − | ++ | + | + | + | − | − |
| 22 | ++ | + | − | − | ++ | ++ | + | + | − | − |
| 23 | +++ | ++ | − | + | ++ | ++ | − | − | − | − |
| 24 | ++ | +++ | − | − | ++ | + | − | − | − | − |
| 25 | + | + | − | + | +++ | ++ | − | − | − | − |
| 26 | + | + | + | + | +++ | ++ | − | + | − | − |
| 27 | ++ | + | − | − | ++ | ++ | + | − | − | − |
| 28 | ++ | ++ | − | − | +++ | ++ | + | − | − | − |
| 29 | + | + | − | − | ++ | + | − | − | − | − |
| 30 | ++ | + | − | − | + | + | — | − | − | − |
| − | 1 | 4 | 20 | 17 | 0 | 2 | 12 | 17 | 29 | 29 |
| + | 11 | 13 | 9 | 11 | 9 | 12 | 16 | 13 | 1 | 1 |
| ++ | 17 | 11 | 1 | 2 | 15 | 16 | 2 | 0 | 0 | 0 |
| +++ | 1 | 2 | 0 | 0 | 6 | 0 | 0 | 0 | 0 | 0 |
| Total Positive Responding | 29 | 26 | 10 | 13 | 30 | 28 | 18 | 13 | 1 | 1 |

A = Reading after 20 plus hours.
B = Reading after 25 plus hours.
Compounds C and D as in Table I.

The above results illustrate the effectiveness with which the new base permits penetration of adrenocortical steroids as shown in columns I, II and IV. Relatively poor results are shown with the usual cream base II. Controls (Placebo bases V and VI) gave no positive results.

SPECIFIC DESCRIPTION

The following examples describe in detail the preparation of representative steroids of this invention.

EXAMPLE 1

Preparation of
9α-Fluoro-11β,21-dihydroxy-16α,17α-(isopropylidenedioxy)-1,4-pregnadiene-3,21-dione 21-valerate To a stirred solution of 3.0 gm. (6.9 millimoles) of triamcinolone acetonide in 50 ml. of pyridine, cooled in an ice/water bath, is added dropwise 1.68 ml. (14.1 millimoles) of n-valeryl chloride. The cooling bath is removed when addition is complete. The reaction mixture is refluxed for one hours, allowed to cool to room temperature and stored at room temperature overnight. The reaction mixture is poured into about 1.5 liters of ice and water with stirring. The aqueous solution is extracted with four 100 ml. portions of chloroform. The chloroform extract is treated with water, dilute hydrochloric acid, dilute sodium bicarbonate and finally, with saturated saline solution. The chloroform extract is dried over anhydrous magnesium sulfate overnight and then evaporated under reduced pressure to a solid. The solid is slurried with acetone/n-hexane (1:19), 25 ml. The product is removed by filtration, giving 3.03 gm. (84.5% yield) of colorless product. Evaporation of the filtrate afforded a second crop, 0.33 gm. (total yield 93.5%). Crystallization from acetone/n-hexane gives a sample exhibiting the following properties: Melting point 262.5°–263.5°C. corrected Kofler hot stage; DTA, single endotherm 264°C, corrected. I. R.— $max^{KB}r$ 3390, 1754, 1733, 1672, 1626, 1166, and 1058 cm$^{-1}$; $[\alpha]_D^{25°}+93°$ (C = .408, CHCl$_3$ 1 dm); $\lambda_{max}{}^{CH_3OH}$ 238 m$\mu$ (16,600). Purity by partition column chromatography 99%. Analysis calculated for C$_{29}$H$_{39}$O$_7$F: C, 67.16; H, 7.58; F, 3.66. Found: C, 67.15; H, 7.75; F, 3.82.

EXAMPLE 2

Preparation of
16α,17α-Cyclopentylidenedioxy-9α-fluoro-11β,21-dihydroxy-1,4-pregnadiene-3,20-dione A 15 gm. (38.1 mmole) portion of 9α-fluoro-11β,16α,17, 21-tetrahydroxy-1,4-pregnadiene-3,20-dione is placed in a 500 ml. round bottom flask equipped with a magnetic stirrer bar and stopper. A 200 ml. (2.26 moles) portion of cyclopentanone and 30 drops of perchloric acid are added and the suspension is stirred at room temperature for about 1½ hours. A pale yellow solution results. This solution is stored in a cold room for about 1 hour. A precipitate forms which is recovered by filtration, washed with n-hexane and air dried yielding 3.6 gm. of product. The filtrate is concentrated under reduced pressure to about 25 ml. A solution of sodium bicarbonate is added until the concentrate is alkaline. A 25 ml. portion of chloroform is added and after mixing the concentrate is stored in a cold room overnight. A precipitate forms which is collected by filtration, washed with water until the washings are neutral to pH paper and air dried yielding an addition 8.4 gm. of product. The second filtrate is evaporated under reduced pressure to an oil. Acetone and activated charcoal are added, the mixture is filtered through diatomaceous earth and the filtration is concentrated on a steam bath while adding n-hexane to the point of incipient crystallization. The mixture is allowed to stand overnight. The precipitate is collected by filtration, washed with acetone:n-hexane (1:9) and air dried yielding 2.7 gm. of product. The total yield for the subject product is 14.7 gm.

EXAMPLE 3

Preparation of
16α,17α-Cyclopentylidenedioxy-9α-fluoro-11β,21-dihydroxy-1,4-pregnadiene-3,20-dione-21-acetate An 11.1 gm. (24.1 mmole) portion of the product of Example 1 is placed in a 250 ml. round bottom flask. A 100 ml. portion of pyridine is added and the mixture is stirred to a complete solution. A 5.5 ml. (54.6 mmole) portion of acetic anhydride is added dropwise and the mixture is stirred for 2½ hours. An 11 ml. portion of methanol is added and the mixture is stirred an additional hour. This mixture is concentrated under reduced pressure to about 10–15 ml. and then poured slowly into a mixture of ice, water and dilute hydrochloric acid. This mixture is stirred and the solid which forms is collected by filtration, washed with water to a neutral pH and air dried yielding 11.5 gm. This solid is taken up in hot acetone, treated with activated charcoal and filtered while hot through diatomaceous earth. The filtrate is concentrated on a steam bath while adding n-hexane to the point of incipient crystallization. This mixture is allowed to cool to room temperature. The solid which forms is collected by filtration, washed with acetone:n-hexane (1:14) and air dried yielding 7.0 gm. of the desired product.

We claim:

1. A new composition of matter comprising a topical cream base providing enhanced penetration of steroids of the following formulation:

| | W/W |
|---|---|
| Steroid | 0.005 to 5.0% |
| Ethoxylated stearyl alcohol | 5 to 25% |
| Benzyl alcohol | 0.9 to 4% |
| Isopropyl palmitate | 1 to 10% |
| Glycerin | 2 to 10% |
| Sorbitol solution U.S.P. | 2 to 10% |
| Lactic or other acid q.s. to pH 3.0–7.0 | |
| Water qs ad | 100% | wherein the steroid is selected from the group consisting of triamcinolone acetonide, triamcinolone acetonide-21-valerate, 16α,17α-cyclopentylidenedioxy-9α-fluoro-11β,21-dihydroxy-1,4-pregnadiene-3,20-dione and 16α,17α-cyclopentylidenedioxy-9α-fluoro-11β,21-dihydroxy-1,4-pregnadiene-3,20-dione-21-acetate.

2. A composition in accordance with claim 1, in which the steroid is triamcinolone acetonide.

3. A composition in accordance with claim 1, in which the steroid is 16α,17α-cyclopentylidenedioxy-9α-fluoro-11β,21-dihydroxy-1,4-pregnadiene-3,20-dione.

4. A composition in accordance with claim 1, in which the steroid is triamcinolone acetonide-21-valerate.

5. A composition in accordance with claim 1, in which the steroid is 16α,17α-cyclopentylidenedioxy-9α-fluoro-11β,21-dihydroxy-1,4-pregnadiene-3,20-dione-21-acetate.

6. A new composition of matter in accordance with claim 1, having substantially the following formulation:

| | W/W |
|---|---|
| Ethoxylated stearyl alcohol | 12.5% |
| Benzyl alcohol | 2.2% |
| Isopropyl palmitate | 2.0% |
| Glycerine | 4.0% |
| Sorbitol solution U.S.P. | 5.0% |
| Lactic acid qs to pH 4.0–5.0 | |
| Water qs to | 100%. |

7. A method for obtaining increased topical absorption of steroids which comprises topically administering the following formulation:

| | W/W | |
|---|---|---|
| Steroid | 0.005 to | 5.0% |
| Ethoxylated stearyl alcohol | 5 to | 25% |
| Benzyl alcohol | 0.9 to | 4% |
| Isopropyl palmitate | 1 to | 10% |
| Glycerin | 2 to | 10% |
| Sorbitol solution U.S.P. | 2 to | 10% |
| Lactic or other acid qs to pH 3.0–7.0 | | |
| Water qs ad | | 100% | wherein the steroid is selected from the group consisting of triamcinolone acetonide, triamcinolone acetonide-21-valerate, 16α,17α-cyclopentylidenedioxy-9α-fluoro-11β,21-dihydroxy-1,4-pregnadiene-3,20-dione and 16α,17αcyclopentylidenedioxy-9α-fluoro-11β,21-dihydroxy-1,4-pregnadiene-3,20-dione-21-acetate.

* * * * *